Aug. 23, 1932.  C. H. DAVIS, JR  1,873,298

CONDENSER

Filed May 31, 1930

Inventor
Charles Hall Davis Jr.
By Spencer Hardway and Fehr.
Attorney

Patented Aug. 23, 1932

1,873,298

UNITED STATES PATENT OFFICE

CHARLES HALL DAVIS, JR., OF ANDERSON, INDIANA, ASSIGNOR TO DELCO-REMY CORPORATION, OF ANDERSON, INDIANA, A CORPORATION OF DELAWARE

CONDENSER

Application filed May 31, 1930. Serial No. 457,745.

This invention relates to electrical condensers, and particularly to that class of condensers used in dual circuits as in double circuit breaker mechanism of ignition apparatus.

One of the objects of the instant invention is to provide a condenser assembly of two condenser units enclosed within a single case.

A further object of this invention is to reduce the cost of condenser manufacture.

Further objects and advantages of the present invention will be apparent from the following description, reference being had to the accompanying drawing wherein a preferred embodiment of one form of the present invention is clearly shown.

Figure 7:
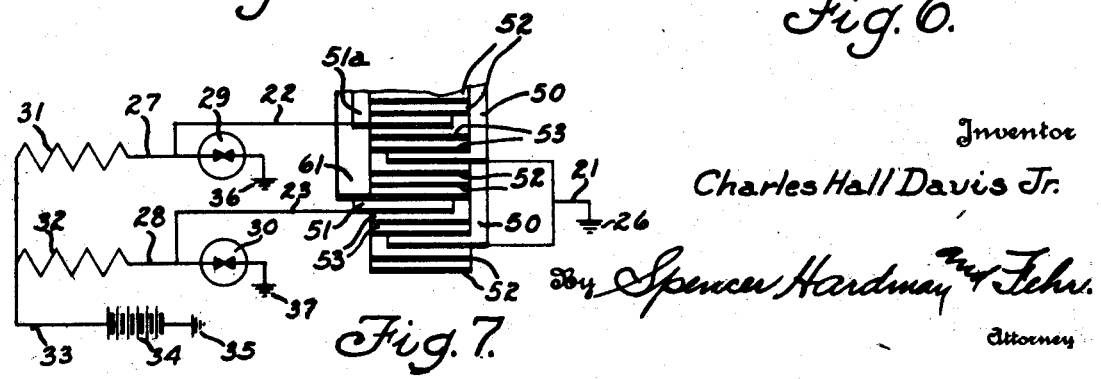
Fig. 7 is a schematic view of the superimposed elements of the condenser assembly illustrating their relative position and their circuit connections within the ignition system.

With particular reference to the drawing, 20 indicates a condenser can or housing having a bracket 21 adapted for securing the same to an element of electrical structure with which it is to be used, and is also provided with leads 22 and 23 terminating with clips 24 and 25 for connection into a desired circuit, substantially as illustrated in Fig. 7. In this specific instance the can 20 and clip 21 operate as one conductor or terminal for the condenser assembly and make provision for grounding the same as at 26 in Fig. 7, while the leads 22 and 23 may each be connected into a lead or conductor 27 and 28 respectively joining a circuit breaker 29 and 30 respectively with the primaries 31 and 32 respectively of ignition coils that eventually combine in a conductor 33 to make connection with a battery 34 grounded at 35, each of the circuit breakers 29 and 30 being grounded as at 36 and 37 respectively.

Figure 1:
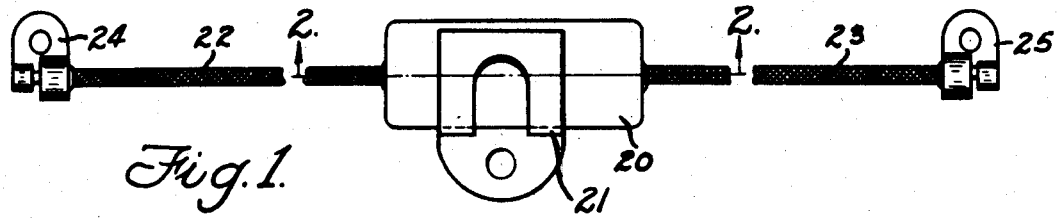
Fig. 1 is a plan view of a condenser assembly involving the instant invention.
Figure 2:
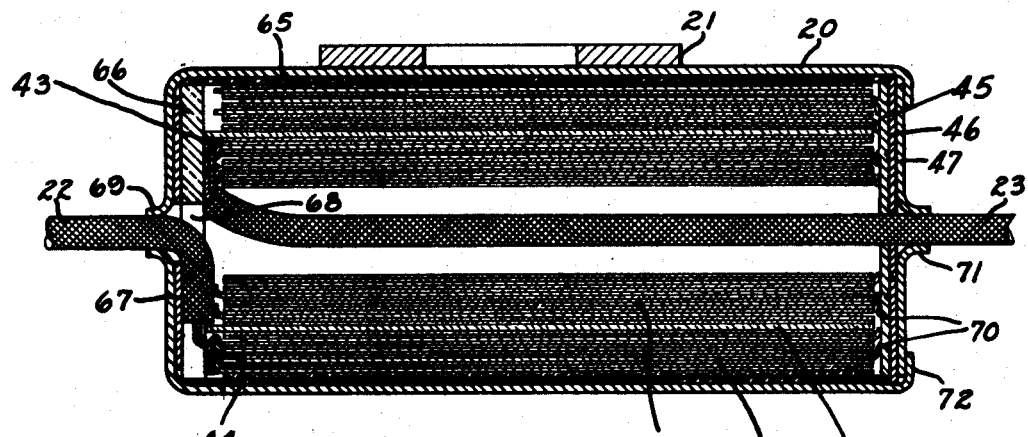
Fig. 2 is a longitudinal section of the same, being an enlarged view substantially on the line and arrows 2—2 of Fig. 1.

The condenser assembly of the instant invention is of novel structure as illustrated in Fig. 2, and comprises a condenser unit 40 wound into cylindrical form and separated from a second condenser unit 41 wound thereabout, by a dielectric separator 42. One of the foils of the condenser unit 40 is electrically connected with the lead 23 as by soldering indicated at 43, while the condenser unit 41 has one of its foils in electrical communication with the lead 22 by soldering at 44. In the specific form here disclosed, the cooperating foil of the unit 40 is common to the unit 41 and cooperates with the other foil therein as will presently appear. This common foil of the two condenser units 40 and 41 is electrically connected with the case 20 by contact disc 45 and a spring conductor 46 making engagement with the head member 47 and thence the can 20 as is specifically illustrated in Fig. 2.

Figure 3:
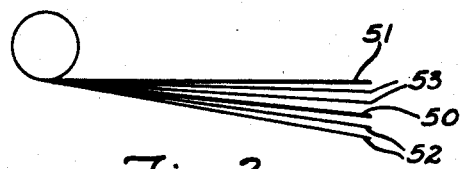
Figs. 3, 4, 5 and 6 are diagrammatic views illustrating some of the details of manufacture.
Figure 4:
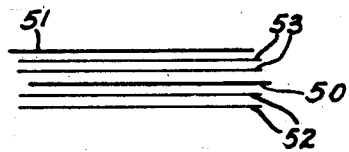

Not only is the condenser in itself novel, but the method of manufacture is also new as will presently appear. In forming the condenser assembly, the condenser unit 40 is first formed by starting upon a winding mandrel a superimposed assembly of condenser foils 50 and 51, each being grouped with a pair of insulating papers or other dielectric material 52 and 53 respectively, and with their edges oppositely exposed or offset as illustrated in Figs. 3 and 4. Here it will be observed that the papers 52 and 53 are in substantial lateral alignment with one another, and that the foils 50 and 51 are each shifted laterally toward opposite sides of the medial line of the winding so that the edge of the margin of the foil 50 projects to the right as viewed in Fig. 4 beyond the layers of the insulating paper 52 and 53, while the edge or margin of the foil 51 projects toward the left hand side of the pile and is there similarly exposed. With the assembly of foils and papers thus wound, a cylinder-like winding will be produced in which the margin of the foil 50 will be exposed at one end and the margin of the foil 51 will be exposed at the other end. The winding of this arranged assembly of foils and papers is continued until the unit 40 of desired capacity is constructed which is diagrammatically illustrated in Fig. 5.

Figure 5:
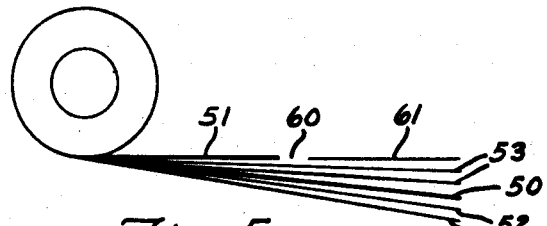
Figure 6:
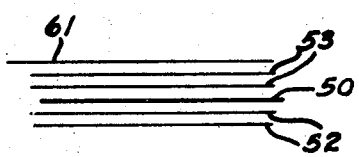

Fig. 3 illustrates the start of the condenser winding, while Fig. 5 illustrates the completed winding of the first condenser unit. At this point in the winding the foil 51 is severed as at 60, and thence a separator 42 consisting of dielectric material 61 is started and wound about the cylindrical winding for a desired number of turns so as to provide a physical separation between the condenser units. By reference to Figs. 5 and 6, this procedure will be apparent, and it will there be noted that the separator 61 is of substantially greater width than the other insulating members so that its edges entirely overlap the foil winding that has been separated. However, this separator is not of sufficient width to overlie the marginal edge of the foil 50 as will be apparent from the drawing.

Upon the completion of winding the separator 61 the strip from which it is drawn is severed and the severed foil 51 is re-started as 51a, and is positioned with respect to the other elements of the condenser unit substantially the same as that occupied in the first condenser unit, whereupon the winding of the superimposed condenser elements is continued until the condenser assembly 41 is provided of substantially equal capacity with that of the first unit 40. With the condenser thus completed to specification the foils and interposed papers may be severed and pasted down to the body of the assembly to keep from unwinding and then impregnated with wax in the usual way. The structure thus built up comprises in substance a pair of concentric cylinders, each of which comprises a pair of oppositely exposed foils insulated from one another, with one of the foils being continuous and common to both condenser units. The condenser units 40 and 41 are in fact separated by the member 42 that projects at one end as at the left hand in Fig. 2 to physically separate the margins of the foil 51 of the first unit from the margins of the foil 51a of the second unit.

The exposed margin of the foil 51 is crushed down and secured to the lead 23 by soldering while the margin of the foil 51a is crushed down and soldered to the lead 22 as hereinbefore described. The lead 23 is then threaded through the hollow core of the condenser assembly and the assembly thus provided is wrapped with insulating material 65 and inserted within the casing 20. Of course the insulation 65 may be a continuation of the insulating papers 52 or 53 after the foils have been severed, or may be a superimposed winding of the material 61, but in all events the condenser assembly is placed within the casing so as to be disposed against a dielectric spacer 66 resiliently supported or cushioned against the bottom of the can 20 by a spring member 67, the lead 22 lying within proper aperture 68 of the dielectric member 66 and projecting through a hollow boss 69 of the can 20. At the open end of the can the foil margins 50 are crushed down and a conductor plate 45 having piercing members 70 for engaging the foils is maintained in engagement therewith by the spring member 46 inserted between it and the cover 47. The cover 47 provides a hollow boss 71 for reception of the lead 23 and is secured within the can 20 by spinning or turning over the same as at 72. At this stage of the game, the terminal clips 24 and 25 may be secured to the leads 22 and 23 respectively.

The condenser structure thus constituted is in substance a three foil condenser of cylindrical form of which one foil is common to both condenser units. Since the foil windings project laterally at each end of the cylindrical form with their edges crushed down and electrically connected, the windings are thus in noninductive relation, and are enclosed within a single casing constituting one terminal of the assembly. Each of the shorter foil windings is provided with a conductor communicating with the exterior of the casing so that the assembly is readily adaptable for dual circuit mechanism. One advantage of the improved condenser is recognized in automotive ignition engineering of the double circuit breaker system where it has heretofore been common to provide a separate condenser assembly for each circuit breaker mechanism used. The instant invention provides for using a single condenser assembly in place of two condenser assemblies that will provide a separate condenser unit for each circuit breaker mechanism.

Considerable space is thus saved in the ignition equipment whereby the necessity of crowding of parts is eliminated, since this improved condenser assembly may be placed in the space usually occupied by one of the two condenser assemblies, which operates to save the space that would be occupied by the other condenser assembly for other elements of the structure. The case 20 being grounded to the common foil of the instant condenser assembly forms one terminal of the system as will be illustrated by reference to Fig. 7. The leads 22 and 23 of the shorter foils of the condenser assembly are then connected with a circuit breaker mechanism as was heretofore done with the separate leads of the two condensers. It will then be seen, by reference to Fig. 7, that whether the circuit breaker 29 or 30 is in operation, it is appropriately connected with one of the foils of the condenser assembly which makes its discharge to the ground connection at 26.

While the form of embodiment of the present invention as herein disclosed, constitutes a preferred form, it is to be understood that other forms might be adopted, all coming within the scope of the claims which follow.

What is claimed is as follows:

1. An electrical condenser comprising in combination, a condenser unit providing a pair of insulated foils, a dielectric winding surrounding the unit, and a second condenser unit disposed about the dielectric winding, said second unit providing a pair of foils, one of which is common with a foil of the first unit, and means electrically connecting the other foil of each unit with a conductor, the common foil of each unit being in electrical communication with a casing enclosing the structure whereby a third conductor is provided.

2. An electrical condenser comprising, in combination, a condenser unit comprising a pair of insulated foils wound to provide a cylinder, a dielectric separator wound about the said cylinder, and a second condenser unit comprising a pair of insulating foils wound about the dielectric separator to enlarge the cylinder, one of the foils of each condenser unit being provided with a lead, the other foil of the condenser units being a continuous strip common to both units, a casing enclosing the condenser assembly, and in electrical communication with the said common foil.

3. A non-inductive condenser assembly comprising in combination, a condenser unit providing a pair of foils insulated and laterally displaced and wound so as to present opposite exposed edges, a second condenser unit concentric with the first and providing a pair of foils, one of which is common to a foil of the first unit, the foils of the second unit being laterally displaced so as to present exposed edges as in the first unit, means providing a terminal for the common foil of both units, and means providing a conductor for each of the other foils of both units.

4. A three-foil condenser comprising in combination, a pair of insulated foils wound so as to expose opposite edges thereof, a dielectric separator about said winding, a third insulated foil wound with one of said pair of insulated foils forming a second pair of insulated foils wound about the first so as to expose opposite edges thereof, the exposed edges of one condenser winding being electrically connected and provided with a common conductor, and the opposite exposed edges of each condenser winding being electrically connected and provided each with a separate conductor.

5. An electrical condenser having a plurality of conducting members comprising in combination; a common conducting member and a separate conducting member insulated from each other wound to provide a condenser unit; a dielectric member wound about said unit; another separate conducting member wound with said common conducting member about said dielectric member forming a second condenser unit; means for electrically connecting said conducting member common to all the units; and means for electrically connecting each of said separate conductor member of each condenser unit.

6. A three-foil condenser comprising in combination; a pair of foil insulated from each other to provide a condenser unit; an insulator about said unit; a third foil wound with one of the first pair of foils and insulated from each other forming a second condenser unit means for electrically connecting the separate foil of each condenser unit with a conductor; and means for electrically connecting the foil common to both units with a conductor.

7. An electrical condenser having a plurality of conducting members comprising in combination; a common conducting member and a separate conducting member insulated from each other wound to provide a condenser unit; another separate conducting member wound with said common conducting member forming a second condenser unit; means for electrically connecting said conducting member common to all the units; means for electrically connecting each of said separate conductor member of each condenser unit; dielectric members about said units; and a casing enclosing the condenser assembly.

In testimony whereof I hereto affix my signature.

CHARLES HALL DAVIS, Jr.